Feb. 11, 1930.　　　S. O. TAYLOR　　　1,746,322
WINDING DEVICE FOR BRAKE OPERATING MECHANISMS
Filed March 19, 1928　　2 Sheets-Sheet 1

INVENTOR:
S. O. TAYLOR.
By Albert J. McCauley
ATTORNEY.

Feb. 11, 1930.   S. O. TAYLOR   1,746,322
WINDING DEVICE FOR BRAKE OPERATING MECHANISMS
Filed March 19, 1928   2 Sheets-Sheet 2
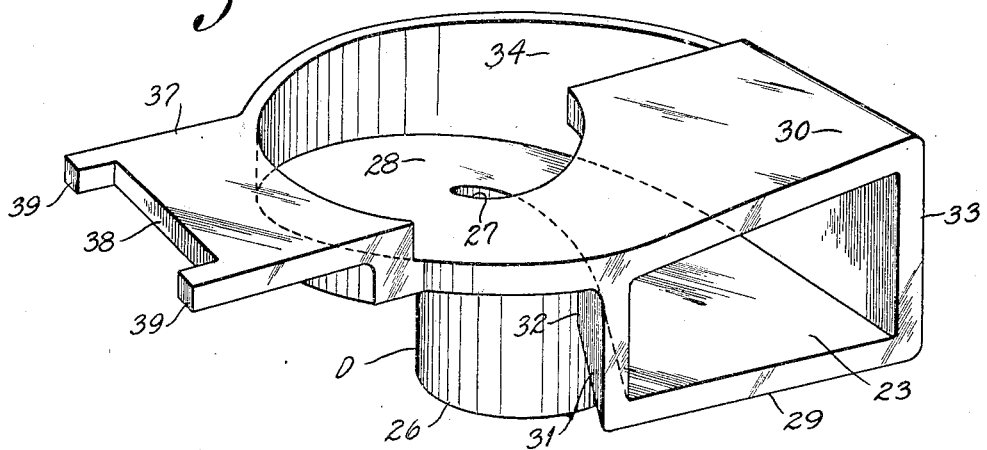
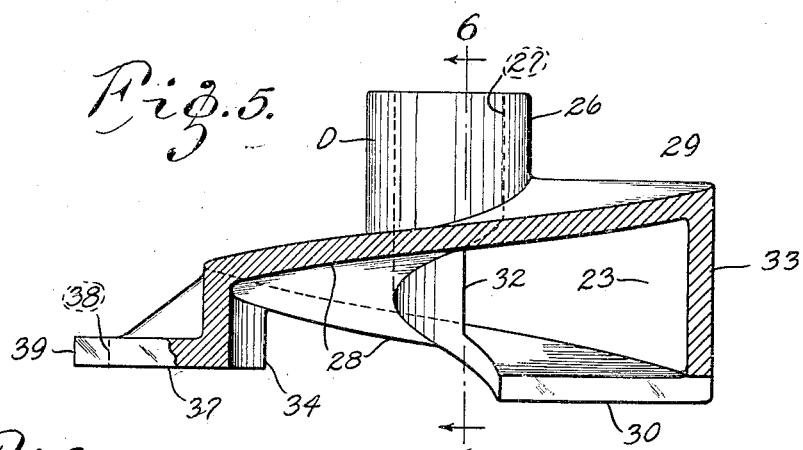
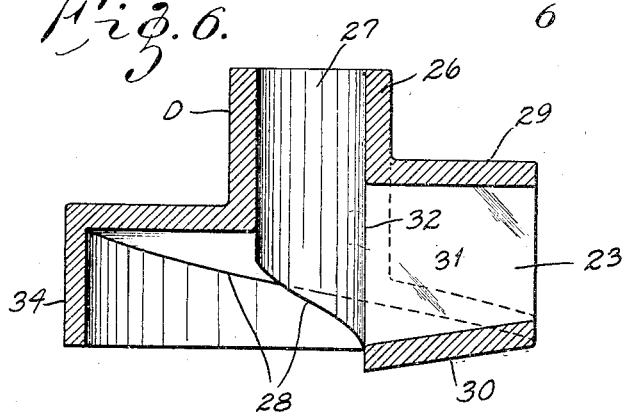
INVENTOR:
S. O. TAYLOR.
By Albert J. McCauley
ATTORNEY.

Patented Feb. 11, 1930

1,746,322

UNITED STATES PATENT OFFICE

STEADMAN O. TAYLOR, OF ST. LOUIS, MISSOURI

WINDING DEVICE FOR BRAKE-OPERATING MECHANISMS

Application filed March 19, 1928. Serial No. 262,651.

This invention relates to a winding device for brake operating mechanisms, and has a more particular application to railroad cars, where it is sometimes necessary to use a hand operated brake mechanism to set the brakes, which mechanisms usually comprise a vertical rotary shaft having a hand wheel at its upper end, and a brake chain that is secured to the lower end of the shaft and is wound around the shaft to set the brakes.

In setting the brakes of a car the brakeman grasps the handwheel (or he may thrust his brake stick into the wheel to get a better leverage) and rotates the brake shaft, whereby the brake chain is wound around the shaft. It is desirable that the chain wind around the shaft in a single helical course, in order that the brakeman may be able to put as much of a pull on the chain at the end of the winding as he does at the beginning. This purpose is often defeated, however, because the chain extends in a horizontal run under the car to engage the brake lever, and the chain sags downwardly and tends to run down the shaft as it is wound thereon. The chain bunches around the lower end of the shaft so as to coil upon itself in a constantly increasing diameter, whereby the effective pull on the chain is reduced and the brakeman may, for this reason, be unable to fully set the brakes.

In order to cause the chain to wind upwardly on the shaft, the chain is usually fastened to the lower end of the shaft with the expectation that as the chain becomes taut it will wind on the shaft in a rising helix, but this object is only partly accomplished in actual service.

Various means have been employed from time to time in an effort to overcome the difficulty described above, such as sheaves or drums having helical grooves to receive the chain, or, again, a drum has been used requiring only one revolution or less to set the brakes, the drum being driven by gearing from the brake shaft. However, these devices have not found general use, because they are bulky or involve the use of elements difficult to keep in repair. Such devices are costly, and frequently failed in actual service to remove the defect they were expected to overcome.

I have found that an essential principle of such a device is to direct the chain, before it reaches the shaft, towards the position in which it is desired the chain should lie at any instant as it advances on the shaft. This position is a point on the course of a helix around the shaft, which is the course the chain should take in setting the brakes of the car.

To illustrate one form of the invention, I have shown a guide slidably mounted on a vertical brake shaft. As the brake shaft is rotated, the chain is wound on the shaft, and the guide will deliver the chain onto the shaft in a rising helical course. The helix so formed cooperates with the guide to continue the formation of the rising helix as long as the shaft is rotated to set the brakes, and when the brakes are released the helix will freely unwind from the shaft, with the guide at all times cooperating with the chain and the helix to prevent bunching or displacement of the chain.

From the foregoing description it will be seen that my device floats on the rising end of the helix, formed as the chain is wound around the shaft, so as to lift the advancing run of the chain in response to the advance of the rising end of the helix, and in this way the chain is directed toward its helical course before it actually lays on the shaft.

With the foregoing and other objects in view, the invention comprises the novel construction, combination and arrangement of parts hereinafter more specifically described and illustrated in the accompanying drawings, wherein is shown the preferred embodiment of the invention. However, it is to be understood that the invention comprehends changes, variations and modifications which come within the scope of the claims hereunto appended.

Fig. 4 is an inverted perspective view of the guide.

Fig. 5 is a view of the guide as it is positioned in Fig. 1, but with a portion of the peripheral flange removed.

Fig. 6 is a sectional view along the line 6—6 of Fig. 5.

Figure 1:
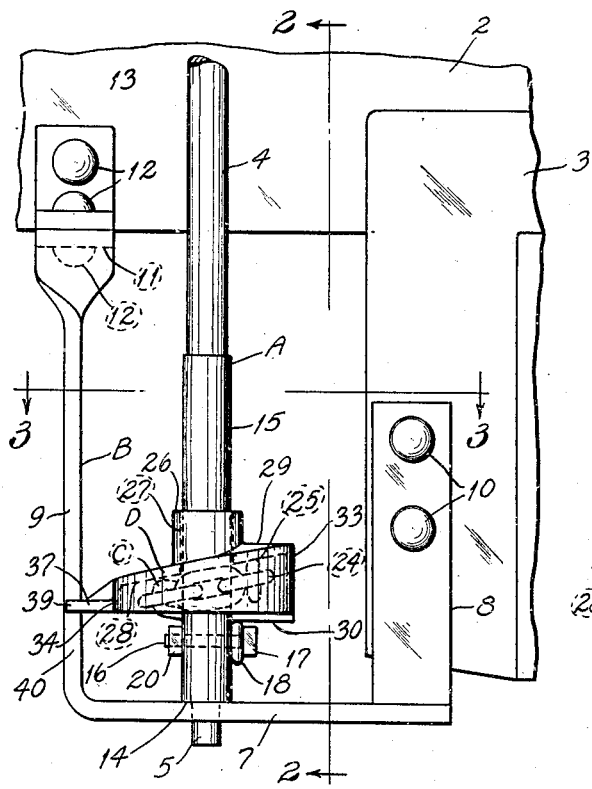
Fig. 1 is an end elevation of a portion of a brake operating mechanism embodying my invention.
Figure 2:
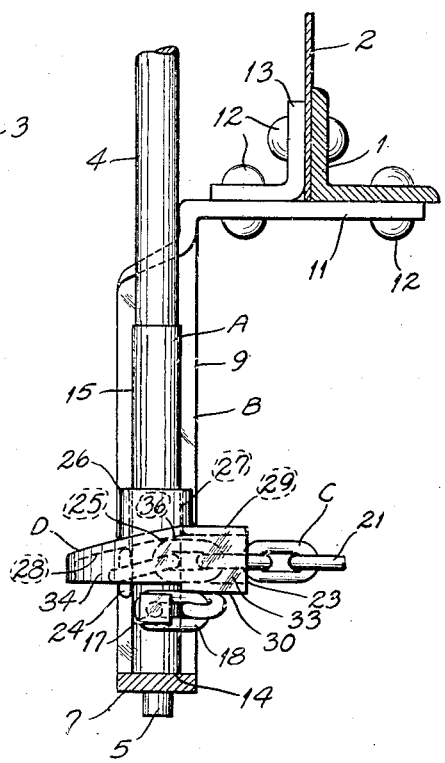
Fig. 2 is a sectional side view along the line 2—2 of Fig. 1.

In Figures 1 and 2, I have shown a portion of an end sill 1 and end wall 2 and a portion of a buffer block 3 of a freight car. A rotary brake shaft A extends vertically alongside the end wall 2 of the car and extends to a point lower than the end sill 1. The brake shaft A terminates in a journal 5 which passes through the horizontal medial portion 7 of a U-shaped brake shaft step B made of strap iron, the legs 8 and 9 of which extend in vertical spaced relation to the brake shaft A. The leg 8 is offset from the horizontal portion 7 and lies against the buffer block 3 and is secured thereto by rivets 10. The leg 9 extends in the plane of the horizontal portion 7 and its terminal portion 11 is twisted and bent to lie flatwise against the under side of the end sill 1, to which it is secured by rivets 12.

A bracket 13 is secured to the upper side of the portion 11 and the end wall 2 in a like manner, by similar rivets 12. Just above the journal 5 the brake shaft A is enlarged to form a shoulder 14 which bears against the horizontal portion 7 of the brake shaft step to support the weight of the shaft, and this enlargement is continued upwardly over a portion of the shaft to form a brake chain drum portion 15, which is a plane cylindrical body and is formed integrally with the upper portion 4 of the shaft A.

Figure 3:
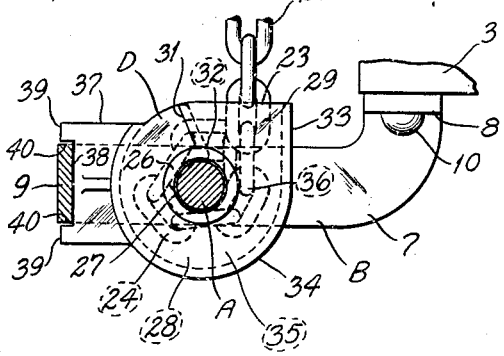
Fig. 3 is a sectional plan view along the line 3—3 of Fig. 1.

The brake chain C is secured to the lower portion of the drum portion 15 by a bolt 16 having a square head 17. The bolt is passed through the terminal link 18 of the chain C and thence through the shaft and engages a nut 20 whereby the said link 18 is clamped between the periphery of the shaft and the head 17 of the bolt 16. The brake chain C extends in a horizontal run 21 under the car body to engage the brake rod 22. (Fig. 3).

The foregoing described construction is found on most freight cars and does not constitute my invention, but my invention co-operates with the leg 9 of the brake shaft step B, the shaft A rotatable in the step, and the chain C to be wound around said shaft A.

My invention comprises a guide D vertically movable with respect to the shaft A, and provided with a passageway 23, for the chain C, leading in a line tangentially to said shaft A, and which forms a means for directing the chain to form a rising helix 24 along and around the drum portion 15 of the shaft A, the rising end of the helix being indicated at 25 (Figs. 1 and 2).

A hub 26, which contacts on its lower face with the rising end 25 of the helix 24 has a bore 27, through which the shaft A is passed to slidably mount the guide D on the said shaft.

The lower end face of the hub is laterally extended to form a helical cam face 28 extending around the shaft A from the under side of the top wall 29 of the passageway 23 to the lower side of the floor 30 thereof (Fig. 4), and this cam face 28 also contacts with the rising end 25 of the helix 24.

The inner side wall 31 of said passageway 23 terminates short of the shaft A and is united, as at 32, with the hub 26 (Figs. 4 and 6). The outer side wall 33 of the passageway 23 is extended to form a peripheral flange 34 depending from the cam face 28, the flange tapering off as it approaches the lower end of the cam face. The flange 34, cam face 28, and shaft A, form a helical channel 35, extending for a distance of one turn of the helix around the shaft, through which the chain C passes after it contacts with the shaft A. (Fig. 3). The side walls 31 and 33 of the passageway 23 diverge in a direction facing the horizontal run 21 of the chain, as clearly shown in Fig. 3, to facilitate the entrance of the chain C into the pasageway 23. In a like manner the top wall 29 and the floor 30 of the passageway 23 may be vertically flared to facilitate the passage of the chain there between as the guide D rises and falls on the helix 24.

The floor 30 of the passageway 23 forms a guiding member to support and lift the run 21 of the chain C as the guide D rises on the helix 24 as said helix is formed around the shaft. This guiding member 30 will at all times direct the run 21 of the chain towards the rising end of the helix. The passageway 23 directs the chain C underneath the cam face 28 as the chain passes onto the shaft A to form the helix. Thus, as the chain C is directed on the shaft A, and the end 25 of the helix rises, the guide D will also rise and lift the run 21 of the chain. Therefore, the advancing portion 36 of the chain passing from the passageway 23 to the shaft A, is approximately in a line tangential to the pitch line of the helix 24. (Fig. 2).

Extending laterally from the flange 34 and disposed approximately right angularly to the axis of the passageway 23 is an arm 37 which contacts at its end face 38 with the adjacent flat side of the leg 9 of the brake shaft step B. The arm 37 also has spaced lugs 39 which contact respectively with the opposite edges 40 of the said leg 9, whereby the arm is guided for vertical movement on the leg 9. By this means the guide D is prevented from rotating on the shaft A, and the axis of the passageway 23 is maintained in alinement with the horizontal run 21 of the chain. (Fig. 3).

In use, the guide D is mounted on the shaft A with the cam face 28 facing downwardly and riding on the uppermost turn of the helix 24 of the chain C, which passes through the channel 35 (Fig. 3) in contact with the shaft. The chain extends tangentially from the shaft A through the passageway 23 and over the floor 30 thereof. Thence the chain continues in the horizontal run 21 as described, and the passageway 23 is disposed in alinement with the said horizontal run 21 and maintained in said alinement by the arm 37 slidably engaging the leg 9.

As the shaft A is rotated to wind the chain C thereon, the cam face 28 contacts with the rising end of the helix 24, as it is formed, so as to raise the guide D on the shaft. At the same time the flange 34 confines the chain so that it cannot radially overlap one turn on another, and the floor 30 uniformly lifts the advancing portion 36 of the chain C and continuously maintains the same in a line tangential to the pitch line of the helix as it is formed.

Thus it will be seen that the chain, before it lays on the shaft, is directed towards the position which it is desired the chain should lie at any instant as it would lie on the shaft, and this is accomplished in an entirely automatic and effective manner.

The device is simple, durable and inexpensive to manufacture. It requires no attention when in use and will reliably perform its functions in any kind of weather. The construction of the device protects the helix from ice and snow, and the device will clear the shaft of accretions as it rises thereon. Bunching of the chain on the shaft is positively prevented, so that the leverage of the pull on the chain is uniform at all times, and breakage of the chain caused by the links kinking on the shaft, is entirely avoided.

I claim:

1. In a brake-operating device provided with a rotary member and a flexible operating member to be wound around said rotary member, a movable guide through which said flexible operating member is directed to said rotary member, said guide surrounding said rotary member and being driven in response to the rotation of said rotary member, so as to deliver said flexible member in a helical course around said rotary member.

2. In a brake-operating device provided with a rotary member, and a flexible operating member to be wound around said rotary member, a guide loosely surrounding and guided by said rotary member and having an opening through which said flexible member passes to said rotary member, said guide being axially movable on said rotary member in response to the advance of the flexible member on said rotary member.

3. In a brake-operating device provided with a rotary brake shaft and a brake chain to be wound in a rising helix around said shaft, a guide contacting with and floating on the rising end of the helix, said guide including a guiding member directing the chain to said rising end.

4. In a brake-operating device provided with a rotary brake shaft and a brake chain to be wound in a rising helix around said shaft, a guide contacting with and floating on the rising end of the helix, said guide including a guiding member directing the chain to said rising end, and means for preventing rotation of said guide.

5. In a brake-operating device provided with a vertical rotary brake shaft and a brake chain to be wound around said shaft, a guide provided with a passageway for said chain leading to said shaft to deliver the chain in a rising helix around the shaft, said guide including a member surrounding said shaft and contacting with and floating on the top of said helix for vertical movement of the guide in response to the delivery of said chain to said shaft, and means for preventing the rotation of said guide.

6. In a brake-operating device provided with a vertical rotary brake shaft and a brake chain to be wound around said shaft, a guide to deliver the chain in a rising helix around the shaft, said guide including a member located above, and retained by gravity in contact with, the rising end of said helix, and a guiding member through which the chain is directed to the underside of said contacting member.

7. In a brake-operating device provided with a vertical rotary brake shaft and a brake chain to be wound around said shaft, a guide movable on the shaft to deliver the chain in a rising helix around the shaft, said guide being provided with a helical channel around the shaft, said channel being open at the bottom and provided with a top wall contacting with the rising end of the helix, and a side wall to confine said end of the helix.

8. In a brake-operating device provided with a vertical rotary brake shaft and a brake chain to be wound around said shaft, a floating guide through which said chain passes to said vertical shaft, said guide being slidable on said shaft and provided with a passageway for the chain leading to the shaft, said guide having a cam face in contact with the top of said chain so as to rise in response to the delivery of the chain to the shaft, and a vertical member cooperating with said floating guide to prevent rotation thereof.

9. In a brake-operating device provided with a vertical rotary brake shaft and a brake chain to be wound around said shaft, a floating guide vertically movable on said shaft and provided with a passageway for said chain leading tangentially to said shaft to deliver the chain in a helix along the shaft, said guide including a helical cam face extending around said shaft from the upper inner side of said passageway to the lower outer side thereof, the inner wall of said passageway terminating short of said shaft and the outer wall being extended to form a peripheral flange depending from said cam face, a hub disposed concentrically to said shaft, said shaft passing through said hub, and means for alining said passageway with the run of said chain, said means including a fixed vertical member spaced from the shaft, and an arm extending laterally from said guide and slidably engaging said vertical member.

10. In a device provided with a rotary member and a flexible member to be wound around said rotary member, a guide surrounding and slidably secured to said rotary member, said guide having a member through which said flexible member is directed to said rotary member, said guide being driven in response to the rotation of said rotary member, so as to deliver said flexible member in a helical course around said rotary member.

11. In a device provided with a rotary member, and a flexible member to be wound around said rotary member, a guide through which said flexible member passes to said rotary member, said guide comprising a hub surrounding and axially movable on said rotary member in response to the advance of the flexible member on said rotary member.

12. In a device provided with a rotary member and a flexible member to be wound around said rotary member, a guide through which said flexible member passes to said rotary member, said guide comprising a hub surrounding said rotary member and a cam contacting with and shifted by said flexible member.

13. In a brake-operating device provided with a rotary brake shaft and a flexible member to be wound around said shaft, a guide provided with a helical channel around the shaft so as to deliver said flexible member in a helical course around said rotary member.

In testimony that I claim the foregoing I hereunto affix my signature.

STEADMAN O. TAYLOR.